(12) United States Patent
Yoo et al.

(10) Patent No.: US 9,111,356 B2
(45) Date of Patent: Aug. 18, 2015

(54) IMAGE SEGMENTATION METHOD USING HIGHER-ORDER CLUSTERING, SYSTEM FOR PROCESSING THE SAME AND RECORDING MEDIUM FOR STORING THE SAME

(75) Inventors: Chang Dong Yoo, Daejeon (KR); Sung Woong Kim, Daejeon (KR); Sang Hyuk Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 176 days.

(21) Appl. No.: 13/594,487

(22) Filed: Aug. 24, 2012

(65) Prior Publication Data
US 2013/0188869 A1 Jul. 25, 2013

(30) Foreign Application Priority Data

Jan. 20, 2012 (KR) .................. 10-2012-0006668

(51) Int. Cl.
*G06T 7/00* (2006.01)

(52) U.S. Cl.
CPC ............. *G06T 7/0081* (2013.01); *G06T 7/0093* (2013.01)

(58) Field of Classification Search
CPC ... G06T 7/0081; G06T 7/0093; G06T 7/0083; G06T 3/4053; G06T 2207/20072; G06K 9/34; G06K 9/342; G06K 9/6267; G06K 9/00624; G06K 9/00234; G06K 9/00281; G06K 9/00704; G06K 9/00791; G06K 9/6224
See application file for complete search history.

(56) References Cited

U.S. PATENT DOCUMENTS

| | | | | |
|---|---|---|---|---|
| 2003/0103665 A1* | 6/2003 | Uppaluri et al. | ............... | 382/131 |
| 2009/0080774 A1* | 3/2009 | Lin et al. | ......................... | 382/176 |
| 2009/0290802 A1* | 11/2009 | Hua et al. | ...................... | 382/225 |
| 2010/0226566 A1* | 9/2010 | Luo et al. | ....................... | 382/164 |
| 2011/0206276 A1* | 8/2011 | Lin et al. | ......................... | 382/164 |
| 2012/0251003 A1* | 10/2012 | Perbet et al. | ................... | 382/173 |
| 2012/0275702 A1* | 11/2012 | Tuzel et al. | .................... | 382/173 |
| 2012/0275703 A1* | 11/2012 | Lv et al. | ......................... | 382/173 |
| 2013/0084007 A1* | 4/2013 | Salamati et al. | ............... | 382/173 |

FOREIGN PATENT DOCUMENTS

| KR | 1020050018179 A | 2/2005 |
|---|---|---|
| KR | 1020090013970 A | 2/2009 |
| KR | 1020110032537 A | 3/2011 |

OTHER PUBLICATIONS

Kim, S. et al., "Higher-Order Correlation Clustering for Image Segmentation," Neutral Information Processing Systems, Spain Granada, Dec. 12, 2011,9 pgs.
(Continued)

*Primary Examiner* — Jingge Wu
(74) *Attorney, Agent, or Firm* — Fredrikson & Byron, P.A.

(57) ABSTRACT

Disclosed herein is a method of processing images based on image segmentation using higher-order correlation clustering. In an image segmentation method according to an embodiment of the present invention, an input image is segmented into superpixels. A hypergraph is constructed by connecting two or more adjacent superpixels, among the superpixels, to one another. A joint feature map is created by extracting feature vectors from respective edges of the hypergraph, and partitioning the hypergraph based on higher-order correlation clustering in consideration of specific constraints.

11 Claims, 6 Drawing Sheets

(56) References Cited

OTHER PUBLICATIONS

Anonymous ICCV Submission, "Task-specific Image Partitioning," ICCV 2011 Submission #1182, 8 pgs.

Sungwoong Kim, Sebastian Nowozin, Pushmeet Kohli and Chang D. Yoo, "Task-Specific Image Partitioning," IEEE, 13 pages, Sep. 19, 2012.

* cited by examiner

IMAGE SEGMENTATION METHOD USING HIGHER-ORDER CLUSTERING, SYSTEM FOR PROCESSING THE SAME AND RECORDING MEDIUM FOR STORING THE SAME

CROSS-REFERENCES TO RELATED APPLICATIONS

This patent application claims the benefit of priority from Korean Patent Application No. 10-2012-0006668, filed on Jan. 20, 2012, the contents of which are incorporated herein by reference in its entirety.

BACKGROUND OF THE INVENTION

1. Field of the Invention

The present invention relates generally to an image processing method and, more particularly, to a method of processing images based on image segmentation using higher-order correlation clustering.

2. Description of the Related Art

Image segmentation refers to an important preprocessing procedure of the latest algorithm related to high-level image understanding.

An image segmentation algorithm may refer to any one of graph-based and non-graph-based algorithms. Compared to a non-graph-based image segmentation algorithm, a graph-based image segmentation algorithm exhibits consistent image segmentations.

Correlation clustering methods may be classified into graph-based, global-objective and edge-labeling algorithms, and exhibit high performance in image segmentation. However, conventional correlation clustering methods are problematic in that segment boundaries are indistinct.

SUMMARY OF THE INVENTION

Accordingly, the present invention has been made keeping in mind the above problems occurring in the prior art, and an object of the present invention is to provide an image segmentation method that has excellent accuracy while rapidly performing image segmentation.

In accordance with an aspect of the present invention, there is provided an image segmentation method using higher-order correlation clustering, including a) segmenting an input image into superpixels; b) constructing a hypergraph by connecting two or more adjacent superpixels, among the superpixels obtained in a), and c) creating a joint feature map by extracting feature vectors from respective edges of the hypergraph, and partitioning the hypergraph based on higher-order correlation clustering in consideration of specific constraints.

Preferably, in c), the specific constraints indicate a relationship among edge labels in which the results of valid image partitioning can be obtained.

Preferably, whether the two or more superpixels belong to the identical region may be determined by maximizing a discriminant function given by the following equation:

$$F(x, y; w) = \sum_{e \in \varepsilon} Hom_w(x, e) y_e$$

$$= \sum_{e \in \varepsilon} \langle w, \phi_e(x) \rangle y_e$$

$$= \sum_{e_p \in \varepsilon_p} \langle w_p, \phi_{e_p}(x) \rangle y_{e_p} + \sum_{e_h \in \varepsilon_h} \langle w_h, \phi_{e_h}(x) \rangle y_{e_h}$$

$$= \langle w, \Phi(x, y) \rangle$$

where x denotes an input image, y denotes labels, w denotes parameters, $\varepsilon$ denotes a set of hyperedges corresponding to $U_{e \in \varepsilon} = v$ (where v is a set of superpixels (nodes)), e denotes a hyperedge having two or more nodes, $$\sum_{e \in \varepsilon} Hom_w(x, e) y_e$$

denotes similarity between adjacent nodes having w as a parameter, $\phi_{e_p}(x)$ denotes a pairwise feature vector into which a difference between features of neighboring superpixels is incorporated, and $\phi_{e_h}(x)$ denotes a higher-order feature vector into which a difference between features of three or more superpixels is incorporated, and $\Phi(x, y)$ denotes a joint feature map.

Preferably, w, $w_p$, and $w_h$ may be estimated by a Structured Support Vector Machine (S-SVM).

Preferably, $\phi_{e_p}(x)$ and $\phi_{e_h}(x)$ may be obtained from visual cues.

In accordance with another aspect of the present invention, there is provided an image system using higher-order correlation clustering, including an image data capturing device for receiving an input image; and an image data processing device for segmenting the input image into superpixels, constructing a hypergraph by connecting two or more adjacent superpixels, creating a joint feature map by extracting feature vectors from respective edges of the hypergraph, and partitioning the hypergraph based on higher-order correlation clustering in consideration of specific constraints.

Preferably, the image data processing device may partition the hypergraph by detecting edge labels in which the discriminant function is maximized in a state in which the parameters and the joint feature map are given.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
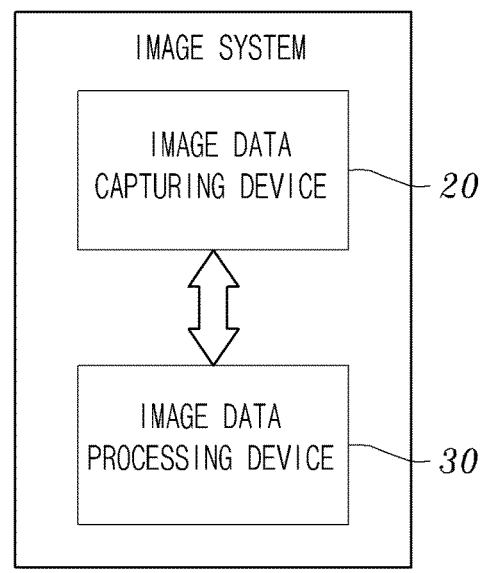
FIG. 1 is a diagram showing an image system according to an embodiment of the present invention.

Specific structural or functional descriptions related to embodiments based on the concept of the present invention and disclosed in the present specification or application are merely illustrated to describe embodiments based on the concept of the present invention, and the embodiments based on the concept of the present invention may be implemented in various forms and should not be interpreted as being limited to the above embodiments described in the present specification or application.

The embodiments based on the concept of the present invention may be modified in various manners and may have various forms, so that specific embodiments are intended to be illustrated in the drawings and described in detail in the present specification or application. However, it should be understood that those embodiments are not intended to limit the embodiments based on the concept of the present invention to specific disclosure forms and they include all changes, equivalents or modifications included in the spirit and scope of the present invention.

The terms such as "first" and "second" may be used to describe various components, but those components should not be limited by the terms. The terms are merely used to distinguish one component from other components, and a first component may be designated as a second component and a second component may be designated as a first component in the similar manner, without departing from the scope based on the concept of the present invention.

Throughout the entire specification, it should be understood that a representation indicating that a first component is "connected" or "coupled" to a second component may include the case where the first component is connected or coupled to the second component with some other component interposed therebetween, as well as the case where the first component is "directly connected" or "directly coupled" to the second component. In contrast, it should be understood that a representation indicating that a first component is "directly connected" or "directly coupled" to a second component means that no component is interposed between the first and second components.

Other representations describing relationships among components, that is, "between" and "directly between" or "adjacent to," and "directly adjacent to," should be interpreted in similar manners.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Further, even in the case of different characters, when the same subscript is used, the characters have commonness for objects meant by the subscript. For example, when p is a subscript, a relevant component has the meaning of "pairwise," and when h is a subscript, a relevant component has the meaning of "higher-order."

Hereinafter, the present invention will be described in detail based on preferred embodiments of the present invention with reference to the attached drawings. The same character has the same meaning.

FIG. 1 is a diagram showing an image system according to an embodiment of the present invention.

Referring to FIG. 1, an image system 10 performs a higher-order correlation clustering method for image segmentation, and includes an image data capturing device 20 and an image data processing device 30.

The image data capturing device 20 is configured to capture image data and may include, for example, illumination sources, various optical elements, holographic elements, phase modulation devices, detectors (sensors, cameras, etc.), or peripheral hardware devices required to support the image data capturing device.

The image data processing device 30 is a device for processing image data captured by the image data capturing device 20 and may be configured to perform image partitioning using a higher-order correlation clustering method for image segmentation, which will be described later, and to label distinct regions obtained by partitioning.

The image data processing device 30 may include a processor for processing the image data using software, a device for controlling the system, a data storage unit for storing the image data, etc.

Figure 2A:
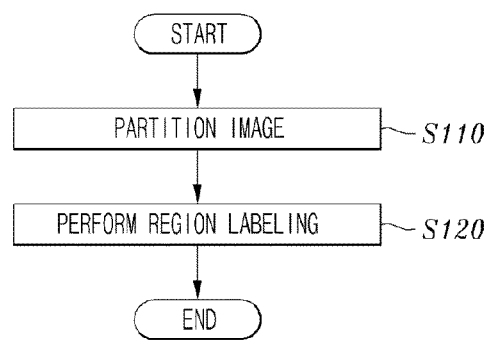
FIG. 2A is an overall flowchart showing an image segmentation method using higher-order correlation clustering.
Figure 2B:
FIG. 2B is a diagram providing the visual understanding of the method of FIG. 2A.

FIG. 2A is an overall flowchart showing the image segmentation method using higher-order correlation clustering, and FIG. 2B is a diagram providing the visual understanding of the method of FIG. 2A. The image segmentation method of FIG. 2A may be performed by the image system 10 of FIG. 1, particularly, by the image data processing device 30.

Referring to FIGS. 2A and 2B, the image segmentation method using higher-order correlation clustering is performed such that if an image is input, the image is partitioned using the higher-order correlation clustering method of the present invention in step S110, and distinct regions obtained by partitioning are labeled in step S120.

Figure 3A:
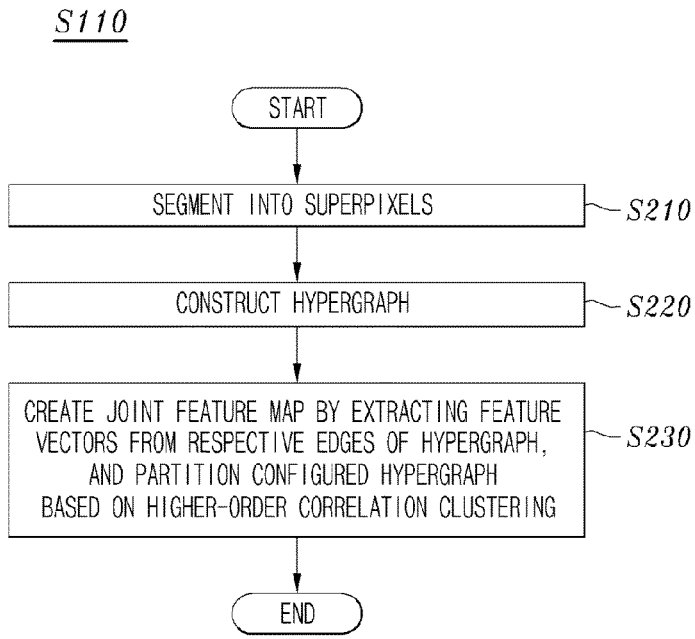
FIG. 3A is a flowchart showing the image segmentation method using higher-order correlation clustering of FIG. 2A.
Figure 3B:
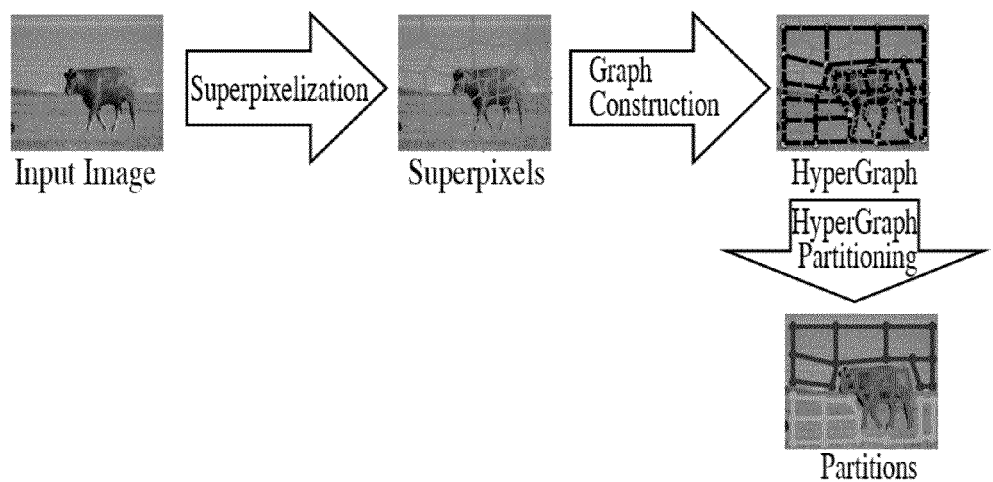
FIG. 3B is a diagram providing the better understanding of the method of FIG. 3A.

FIG. 3A is a flowchart showing the image segmentation method using correlation clustering of FIG. 2A, and FIG. 3B is a diagram providing a better understanding of the method of FIG. 3A. The method of FIG. 3A may be performed by the image system 10 of FIG. 1, particularly, by the image data processing device 30.

Referring to FIGS. 3A and 3B, when an image is input, the input image is segmented into superpixels in step S210. In this case, each superpixel may refer to a region in which a plurality of pixels are merged, and those superpixels may correspond to superpixels roughly divided based on preset criteria.

Next, a hypergraph is constructed by connecting two or more neighboring superpixels among the superpixels in step S220. In greater detail, each of the obtained superpixels is set to a single node, and two or more adjacent nodes are connected to form hyperedges, and then the graph is constructed.

In this case, a hyperedge label indicates whether all of the superpixels in a hyperedge are merged or not.

Next, a joint feature map is created by extracting feature vectors from respective edges, and image partitions are obtained by partitioning the constructed hypergraph on the basis of higher-order correlation clustering in step S230. The higher-order correlation clustering method according to the present invention will be described below.

Figure 4:
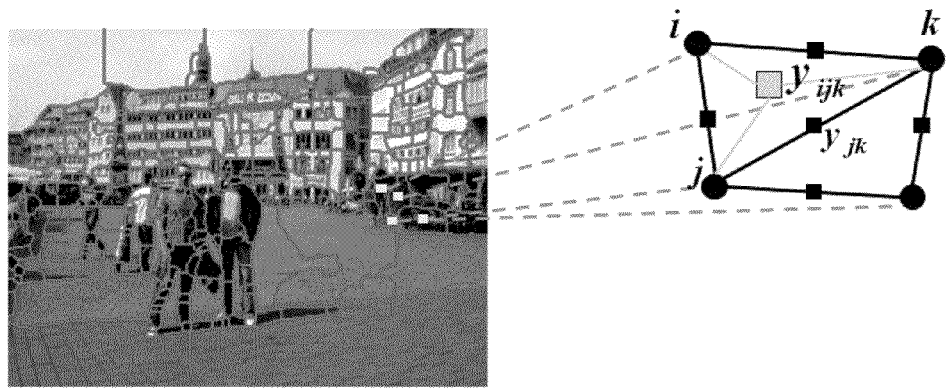
FIGS. 4 to 6 are diagrams providing the better understanding of the higher-order correlation clustering method according to the present invention.
Figure 5:
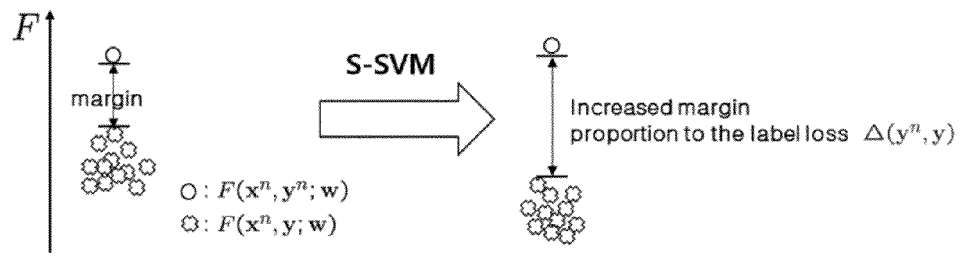
Figure 6:

FIGS. 4 to 6 are diagrams providing the better understanding of the higher-order correlation clustering method according to the present invention. Referring to FIG. 4, nodes (for example, i, j, k) correspond to superpixels, and links are configured to connect the nodes of adjacent superpixels to one another. In this case, unlike an existing typical graph in which each link is configured only between two nodes, the hypergraph is configured such that links are formed even between two or more (three in FIG. 4) nodes.

The hyperedge labels are defined such that when all of two or more adjacent nodes (for example, i, j, and k nodes) belong to the same region, a binary label $y_e$ (for example, $y_{ijk}$)=1 is satisfied; otherwise a binary label $y_e$ (for example, $y_{ijk}$)=0 is satisfied.

In FIG. 4, a discriminant function for measuring whether a plurality of nodes (for example, nodes i, j and k) belong to the same region is represented by the following Equation (1):

$$F(x, y; w) = \sum_{e \in \varepsilon} Hom_w(x, e) y_e \qquad (1)$$
$$= \sum_{e \in \varepsilon} \langle w, \phi_e(x) \rangle y_e$$
$$= \sum_{e_p \in \varepsilon_p} \langle w_p, \phi_{e_p}(x) \rangle y_{e_p} + \sum_{e_h \in \varepsilon_h} \langle w_h, \phi_{e_h}(x) \rangle y_{e_h}$$
$$= \langle w, \Phi(x, y) \rangle$$

where x denotes an input image, y denotes labels, and w denotes parameters.

Further, in the superpixel hypergraph $H\mathscr{G} =(v,\epsilon)g$, v denotes a set of superpixels (nodes), $\epsilon$ denotes a set of hyperedges corresponding to $\cup_{e \in \epsilon}=v$, and e denotes a hyperedge having two or more nodes.

Therefore, $\epsilon$ can be divided into two disjoint subsets $\epsilon_p=\{e \in \epsilon \| |e|=2\}$ and $\epsilon_h=\{e \in \epsilon \| |e|>2\}$, and $\epsilon_p \cup \epsilon_h=\epsilon$ is satisfied.

Further, $$\sum_{e \in \varepsilon} Hom_w(x, e) y_e$$

denotes similarity between adjacent nodes having w as the parameter, and indicates that high similarity is present when $$\sum_{e \in \varepsilon} Hom_w(x, e) y_e$$

has a large positive value, and indicates that a high difference is present when it has a large negative value.

$\phi_e(x)$ denotes a feature vector and is assigned in the form of feature vectors $\phi_{e_p}(x)$ and $\phi_{e_h}(x)$. $\phi_{e_p}(x)$ and $\phi_{e_h}(x)$ respectively indicate a pairwise feature vector into which a difference between the features of two neighboring superpixels is incorporated, and a higher-order feature vector into which a difference between the features of three or more superpixels is incorporated.

w denotes a parameter and is also assigned in the form of $w_p$ and $w_h$. $\Phi(x, y)$ denotes a joint feature map. Such w is inferred by a Structured Support Vector Machine (S-SVM), which will be described later.

Image segmentation is intended to maximize the discriminant function F(x, y; w) and then infer a binary edge label ŷ on the superpixel hypergraph $H\mathscr{G} =(v, \epsilon)g$ as given by the following Equation (2), where v denotes a set of nodes and $\epsilon$ denotes a set of edges, $$\hat{y} = \underset{y \in y}{\operatorname{argmax}} F(x, y; w) \qquad (2)$$

where y denotes a set of $\{0, 1\}^{|\epsilon|}$ corresponding to valid partitioning.

Edge labels ŷ in which the discriminant function F(x, y; w) in which specific constraints causing the label y to be a valid set are considered is maximized are simultaneously estimated.

In this case, the specific constraints indicate a relationship among edge labels in which the results of valid image partitioning can be obtained. For example, when nodes i, j, and k constitute a single hyperedge and a binary label $y_{ijk}$=1 among the three nodes (it is determined that nodes i, j, and k belong to the same region), all of a binary label $y_{ij}$ between nodes i and j, a binary label $y_{jk}$ between nodes j and k, and a binary label $y_{ik}$ between nodes i and k must be '1' in order to implement valid image partitioning.

In this case, the problem of solving Equation (2) is nondeterministic polynomial time (NP)-hard because edges must be labeled as binary values in consideration of even the specific constraints, and thus the complexity of Equation (2) is too high for solving. Therefore, y is approximated using Linear Program (LP) relaxation that enables relaxation so that y can have even a value between 0 and 1, for example, 0.2 or 0.4. In this case, the results of approximation obtained from LP relaxation may be rounded down, and then a valid value of 0 or 1 may be simply obtained. For example, when a value of 0.9 or 0.7 is obtained, it may be regarded as a value of 0 by means of rounding down.

These higher-order inequalities can be formulated as;

$$y_{e_h} \leq y_{e_p}, \forall e_p \in \varepsilon_p \mid e_p \subset e_h,$$
$$(1 - y_{e_h}) \leq \sum_{e_p \in \varepsilon_p \mid e_p \subset e_h} (1 - y_{e_p})$$

Indeed, the LP relaxation to approximately solve Equation (2) is formulated as;

$$\underset{y}{\operatorname{argmax}} \sum_{e_p \in \varepsilon_p} \langle w_p, \phi_{e_p}(x) \rangle y_{e_p} + \sum_{e_h \in \varepsilon_h} \langle w_h, \phi_{e_h}(x) \rangle y_{e_h}$$

s.t. $\forall e \in \epsilon(=\epsilon_p \cup \epsilon_h)$, $y_e \in [0,1]$,
$\forall e_p \in \epsilon_p$, cycle inequalities, odd-wheel equalities,
$\forall e_h \in \epsilon_h$, higher-order inequalities.

(Here, in connection with the "cycle inequalities" and "odd-wheel inequalities", see the S. Nowozin and S. Jegelka, "Solution stability in linear programming relaxations: Graph partitioning and unsupervised learning," in ICML, 2009.)

Note that the proposed higher-order correlation clustering follows the concept of soft constraints: superpixels within a hyperedge are encouraged to merge if a hyperedge is highly homogeneous.

As shown in Equation (1), F(x, y; w) is defined by a linear form of $w_p$ and $\phi_{e_p}(x)$ and of $w_h$ and $\phi_{e_h}(x)$.

From visual cues that can be extracted from superpixels, $\phi_{e_p}(x)$ and $\phi_{e_h}(x)$ can be defined by the following Equation (3) and the following Equation (4), respectively, $$\phi_{e_p} = [\phi_{e_p}{}^c; \phi_{e_p}{}^t; \phi_{e_p}{}^s; \phi_{e_p}{}^e; \phi_{e_p}{}^v; 1] \quad (3)$$

where $\phi_{e_p}{}^c$ may denote a color difference between two superpixels, $\phi_{e_p}{}^t$ may denote a texture difference between the two superpixels, $\phi_{e_p}{}^s$ may denote a shape/location difference between the two superpixels, $\phi_{e_p}{}^e$ may denote an edge strength between the two superpixels, and $\phi_{e_p}{}^v$ may denote the feature of joint visual word posterior between the two superpixels.

$$\phi_{e_h} = [\phi_{e_h}{}^{va}; \phi_{e_h}{}^e; \phi_{e_h}{}^{tm}; 1] \quad (4)$$

where $\phi_{e_h}{}^{va}$ may denote a color/texture variance between superpixels in a hyperedge, $\phi_{e_h}{}^e$ may denote edge strength, and $\phi_{e_h}{}^{tm}$ may denote a template matching feature.

The parameters $w$, $w_p$, and $w_h$ may be estimated from training data using a Structured Support Vector Machine (S-SVM). The S-SVM will be briefly described below.

Considering N training samples $\{x^n, y^n\}_{n=1}^N$ (where $y^n$ denotes actual edge labels for an n-th training image (ground-truth edge labels), the S-SVM may optimize the parameter w by minimizing a quadratic objective function subject to a set of linear margin constraints, as given by the following Equation (5):

$$\min_{w,\xi} \frac{1}{2}\|w\|^2 + C\sum_{n=1}^N \xi_n \quad (5)$$

$$\text{s.t. } \langle w, \Delta\Phi(x^n, y)\rangle \geq \Delta(y^n, y) - \xi_n, \forall n, y \in y \setminus y^n$$

$$\xi_n \geq 0, \forall n$$

where $\Delta\Phi(x^n, y) = \Phi(x^n, y^n) - \Phi(x^n, y)$ is satisfied, and C is greater than 0 and is a constant for controlling a trade-off between the maximization of the margin (refer to FIG. 5) and the minimization of an error.

In the S-SVM, the margin is scaled by a loss $\Delta(y^n, y)$ indicating a difference between y and $y^n$.

Since the S-SVM has a large number of margin constraints, it is difficult to solve Equation (5). Therefore, Equation (5) is solved using a cutting plane algorithm.

The cutting plane algorithm is disclosed in a document proposed by I. Tsochantaridis, T. Joachims, T. Hofmann, and Y. Altun and entitled "Large margin methods for structured and independent output variables" in JMLR, 6, 2005 and a document proposed by S. Nowozin and S. Jegelka and entitled "Solution stability in linear programming relaxations: Graph partitioning and unsupervised learning" in ICML, 2009. The method of the cutting plane algorithm is well known in the art.

The loss is represented by the following Equation (6):

$$\begin{cases} \Delta(y^n, y) > 0, & \text{if } y \neq y^n \\ \Delta(y^n, y) = 0, & \text{if } y = y^n \end{cases} \quad (6)$$

Referring to FIG. 6, in the case of correlation clustering for image segmentation according to the present invention, the number of edges labeled as 1 (indicated in a red color) may be larger than the number of edges labeled as 0 (indicated in a green color). In this case, in spite of losses having different importance, when they are treated as the loss of the same importance, a problem may arise in that the overall image may be clustered into a single region.

Therefore, in order to solve this problem, the relative weights $R_p$ and $R_h$ are assigned to edges that have been labeled as 0, so that the loss can be represented by the following Equation (7):

$$\Delta(y^n, y) = \sum_{e_p \in \varepsilon_p} \left(R_p y_{e_p}^n + y_{e_p} - (R_p + 1) y_{e_p}^n y_{e_p}\right) + \quad (7)$$

$$D \sum_{e_h \in \varepsilon_h} \left(R_h y_{e_h}^n + y_{e_h} - (R_h + 1) y_{e_h}^n y_{e_h}\right)$$

where D denotes the relative weight of the loss at a higher-order edge label to that of the loss at a pairwise edge label, and $R_p$ and $R_h$ are relative weights that are less than 1.

Figure 7:
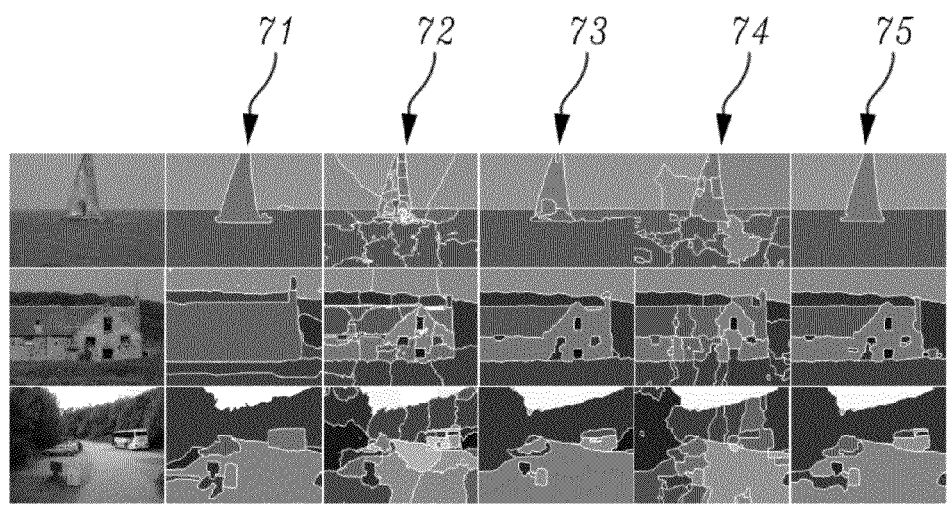
FIG. 7 is a diagram showing the effects of the present invention, which shows the results of performing region labeling after image partitioning using various methods.

FIG. 7 is a diagram showing the effects of the present invention, which shows the results of performing region labeling after image partitioning using various methods.

Referring to FIG. 7, compared to the results 72, 73 and 74 of performing region labeling after image partitioning using various conventional methods, the result 75 of performing region labeling after image partitioning using the method of the present invention is more similar to an actual image (ground-truth) 71.

The method of the present invention can be implemented in the form of computer-readable code stored in a computer-readable recording medium. The code may enable the microprocessor of a computer.

The computer-readable recording medium includes all types of recording devices that store data readable by a computer system.

Examples of the computer-readable recording medium include Read Only Memory (ROM), Random Access Memory (RAM), Compact Disc ROM (CD-ROM), magnetic tape, a floppy disc, an optical data storage device, etc. Further, the program code for performing the image segmentation method according to the present invention may be transmitted in the form of a carrier wave (for example, via transmission over the Internet).

Furthermore, the computer-readable recording medium may be distributed across computer systems connected to each other over a network and may be stored and executed as computer-readable code in a distributed manner. Furthermore, the functional program, code, and code segments for implementing the present invention may be easily inferred by programmers skilled in the art to which the present invention pertains.

As described above, the image segmentation method using higher-order correlation clustering according to the present invention is advantageous in that since a wider region can be simultaneously processed, image segmentation can be rapidly performed, and thus efficiency is improved.

Further, the image segmentation method using higher-order correlation clustering according to the present invention is advantageous in that highly accurate results related to image partitioning and region labeling can be obtained compared to other methods.

Although the preferred embodiments of the present invention have been disclosed for illustrative purposes, those skilled in the art will appreciate that various changes, modifications, and additions are possible, without departing from the scope and spirit of the invention as disclosed in the accompanying claims. Therefore, it should be understood that those changes, modifications and additions belong to the scope of the accompanying claims.

What is claimed is:

1. An image segmentation method using higher-order correlation clustering, comprising:
   a) segmenting an input image into superpixels;
   b) constructing a hypergraph by connecting two or more adjacent superpixels, among the superpixels obtained in a); and
   c) creating a joint feature map by extracting feature vectors from respective edges of the hypergraph, and partitioning the hypergraph based on higher-order correlation clustering in consideration of specific constraints, wherein whether the two or more superpixels belong to the identical region is determined using a sign and magnitude of results of a discriminant function.

2. The image segmentation method according to claim 1, wherein in c), the specific constraints indicate a relationship among edge labels in which the results of valid image partitioning can be obtained.

3. The image segmentation method according to claim 2, wherein the discriminant function is given by the following equation:

$$F(x, y; w) = \sum_{e \in \varepsilon} Hom_w(x, e) y_e$$
$$= \sum_{e \in \varepsilon} \langle w, \phi_e(x) \rangle y_e$$
$$= \sum_{e_p \in \varepsilon_p} \langle w_p, \phi_{e_p}(x) \rangle y_{e_p} + \sum_{e_h \in \varepsilon_h} \langle w_h, \phi_{e_h}(x) \rangle y_{e_h} \text{ where}$$
$$= \langle w, \Phi(x, y) \rangle$$

x denotes an input image, y denotes labels, w denotes parameters, $\varepsilon$ denotes a set of hyperedges corresponding to $\cup_{e \in \varepsilon} = v$ (where v is a set of superpixels (nodes)), e denotes a hyperedge having two or more nodes, $$\sum_{e \in \varepsilon} Hom_w(x, e) y_e$$

denotes similarity between adjacent nodes having w as a parameter, $\phi_{e_p}(x)$ denotes a pairwise feature vector into which a difference between features of neighboring superpixels is incorporated, and $\phi_{e_h}(x)$ denotes a higher-order feature vector into which a difference between features of three or more superpixels is incorporated, and $\Phi(x, y)$ denotes a joint feature map.

4. The image segmentation method according to claim 3, wherein:
   c) is configured to partition the hypergraph by detecting edge labels in which the discriminant function is maximized in a state in which the parameters and the joint feature map are given,
   w, $w_p$, and $w_h$ are estimated by a Structured Support Vector Machine (S-SVM).

5. The image segmentation method according to claim 3, wherein $\phi_{e_p}(x)$ and $\phi_{e_h}(x)$ are obtained from visual cues.

6. A computer-readable non-transitory tangible recording medium for storing a program for implementing the method set forth in claim 1.

7. An image system using higher-order correlation clustering, comprising:
   an image data capturing device for receiving an input image; and
   an image data processing device for segmenting the input image into superpixels, constructing a hypergraph by connecting two or more adjacent superpixels, creating a joint feature map by extracting feature vectors from respective edges of the hypergraph, and partitioning the hypergraph based on higher-order correlation clustering in consideration of specific constraints, wherein whether the two or more superpixels belong to the identical region is determined using a sign and magnitude of result of a discriminant function.

8. The image system according to claim 7, wherein the specific constraints indicate a relationship among edge labels in which the results of valid image partitioning can be obtained.

9. The image system according to claim 8, wherein whether the two or more superpixels belong to the identical region is determined using a sign and magnitude of results of a discriminant function given by the following equation:

$$F(x, y; w) = \sum_{e \in \varepsilon} Hom_w(x, e) y_e$$
$$= \sum_{e \in \varepsilon} \langle w, \phi_e(x) \rangle y_e$$
$$= \sum_{e_p \in \varepsilon_p} \langle w_p, \phi_{e_p}(x) \rangle y_{e_p} + \sum_{e_h \in \varepsilon_h} \langle w_h, \phi_{e_h}(x) \rangle y_{e_h} \text{ where}$$
$$= \langle w, \Phi(x, y) \rangle$$

x denotes an input image, y denotes labels, w denotes parameters, $\varepsilon$ denotes a set of hyperedges corresponding to $\cup_{e \in \varepsilon} = v$ (where v is a set of superpixels (nodes)), e denotes a hyperedge having two or more nodes, $$\sum_{e \in \varepsilon} Hom_w(x, e) y_e$$

denotes similarity between adjacent nodes having w as a parameter, $\phi_{e_p}(x)$ denotes a pairwise feature vector into which a difference between features of neighboring superpixels is incorporated, and $\phi_{e_h}(x)$ denotes a higher-order feature vector into which a difference between features of three or more superpixels is incorporated, and $\Phi(x, y)$ denotes a joint feature map.

10. The image system according to claim 9, wherein the image data processing device is configured such that:
   the hypergraph is partitioned by detecting edge labels in which the discriminant function is maximized in a state in which the parameters and the joint feature map are given, and
   w, $w_p$, and $w_h$ are estimated by a Structured Support Vector Machine (S-SVM).

11. The image system according to claim 9, wherein $\phi_{e_p}(x)$ and $\phi_{e_h}(x)$ are obtained from visual cues.

* * * * *